US012708896B2

(12) United States Patent
Sehgal et al.

(10) Patent No.: US 12,708,896 B2
(45) Date of Patent: Aug. 18, 2026

(54) MICROFLUIDIC DEVICE, PRODUCTION OF A MICROFLUIDIC DEVICE AND METHOD AND SYSTEM FOR PERFORMING INORGANIC DETERMINATIONS

(71) Applicant: NORDETECT APS, Copenhagen N (DK)

(72) Inventors: Palak Sehgal, Copenhagen N (DK); Keenan Pinto, Copenhagen N (DK)

(73) Assignee: NORDETECT HOLDINGS, INC., Rochester, NY (US)

( * ) Notice: Subject to any disclaimer, the term of this patent is extended or adjusted under 35 U.S.C. 154(b) by 463 days.

(21) Appl. No.: 18/335,456

(22) Filed: Jun. 15, 2023

(65) Prior Publication Data

US 2023/0415150 A1 Dec. 28, 2023

Related U.S. Application Data

(63) Continuation of application No. 17/946,778, filed on Sep. 16, 2022, now Pat. No. 11,717,820, which is a (Continued)

(30) Foreign Application Priority Data

Mar. 17, 2020 (DK) ........................... PA 2020 70172

(51) Int. Cl.
*B01L 3/00* (2006.01)

(52) U.S. Cl.
CPC ....... *B01L 3/502707* (2013.01); *B01L 3/5023* (2013.01); *B01L 3/527* (2013.01); (Continued)

(58) Field of Classification Search
CPC .. B01L 3/502707; B01L 3/5023; B01L 3/527; B01L 2200/16; B01L 2300/0816; (Continued)

(56) References Cited

U.S. PATENT DOCUMENTS

| | | | |
|---|---|---|---|
| 5,850,620 | A | 12/1998 | Skotnikov et al. |
| 7,412,990 | B2 | 8/2008 | Chung et al. |

(Continued)

FOREIGN PATENT DOCUMENTS

| | | |
|---|---|---|
| CN | 202330288 U | 7/2012 |
| CN | 103041880 A | 4/2013 |

(Continued)

OTHER PUBLICATIONS

Indian Examination Report for 202247058649 dated Jun. 9, 2025.

(Continued)

*Primary Examiner* — Dennis White
(74) *Attorney, Agent, or Firm* — Chrisman Gallo Tochtrop LLC

(57) ABSTRACT

A method of producing a microfluidic device, including providing at least two solid layers and at least one reagent disc comprising a support disc carrying at least one dry reagent, arranging the reagent disk(s) and stacking the solid layers to form a microfluidic channel arrangement including at least one opening into a channel of the microfluidic channel arrangement and wherein the reagent disk(s) is located in the microfluidic channel arrangement.

20 Claims, 6 Drawing Sheets

Related U.S. Application Data continuation of application No. PCT/EP2021/056718, filed on Mar. 16, 2021.

(52) U.S. Cl.
CPC ... *B01L 2200/16* (2013.01); *B01L 2300/0816* (2013.01); *B01L 2400/0406* (2013.01)

(58) Field of Classification Search
CPC ....... B01L 2400/0406; B01L 2300/069; B01L 2300/0887
See application file for complete search history.

(56) References Cited

U.S. PATENT DOCUMENTS

| | | | |
|---|---|---|---|
| 8,512,648 B2 | 8/2013 | Bau-Madsen | |
| 10,145,192 B1 | 12/2018 | Kelley et al. | |
| 2010/0081216 A1* | 4/2010 | Yager | B01L 3/5027 436/524 |
| 2010/0175993 A1 | 7/2010 | Lee et al. | |
| 2011/0123398 A1 | 5/2011 | Carrilho et al. | |
| 2012/0171698 A1 | 7/2012 | Yager et al. | |
| 2017/0043341 A1 | 2/2017 | Benco et al. | |
| 2017/0061052 A1 | 3/2017 | Gates et al. | |
| 2018/0229234 A1 | 8/2018 | Ohta et al. | |
| 2019/0258760 A1 | 8/2019 | Lee | |
| 2019/0376888 A1* | 12/2019 | Chou | G01N 1/31 |
| 2020/0116664 A1 | 4/2020 | Abeyrathne et al. | |

FOREIGN PATENT DOCUMENTS

| | | |
|---|---|---|
| CN | 205235991 U * | 5/2016 |
| EP | 1 694 110 B1 | 3/2012 |
| JP | 2002-503331 A | 1/2002 |
| WO | 97/21090 A1 | 6/1997 |
| WO | 2008/086809 A1 | 7/2008 |
| WO | 2011/087813 A2 | 7/2011 |
| WO | 2012/154306 A1 | 11/2012 |
| WO | 2015/020880 A2 | 2/2015 |

OTHER PUBLICATIONS

Cade-Menun, B. et al., "Characterizing the phosphorus forms extracted from the soil by the Mehlich III soil test." Geochemical Transactions, vol. 19, No. 7, 2008.
Kim, H. J., et al., "Evaluation of Nitrate and Potassium Ion-Selective Membranes for Soil Macronutrient Sensing." American Society of Agricultural and Biological Engineers, vol. 49, No. 3, 2006, pp. 597-606.
International Search Report and Written Opinion in corresponding application, PCT/EP2021/056718; Mailing date: Oct. 26, 2021.
Kalinichev, A. et al., "Ion-Selective Optical Sensors: A New Look at Well-Established Techniques of Signal Acquisition", Proceedings, Dec. 7, 2018, 2, No. 13, 825. https://doi.org/10.3390/proceedings2130825.
Teledyne CETAC Technologies. "Soil Analysis using Mehlich 3 Extractant Technique for Sample Preparation" [Brochure]. Dated 2014, last retrieved Nov. 29, 2022, from https://www.teledynecetac.com/resourceSite/Application%20Notes/HAM0852.pdf.
Olsen, S. R., et al., "Estimation of Available Phosphorus in Soils by Extraction with Sodium Bicarbonate", Circular, No. 939, U.S. Department of Agriculture, Mar. 1954.
Kim, G. et al., "Disposable Nitrate-Selective Optical Sensor Based on Fluorescent Dye", Journal of Biosystems Engineering, vol. 37, No. 3, 2012.
Sigma-Aldrich. "Good" Buffers. https://www.sigmaaldrich.com/US/en/product/sigma/gb11. Accessed Nov. 29, 2022.
Canadian Office Action for 3,174,608 dated Jul. 29, 2025.

* cited by examiner

MICROFLUIDIC DEVICE, PRODUCTION OF A MICROFLUIDIC DEVICE AND METHOD AND SYSTEM FOR PERFORMING INORGANIC DETERMINATIONS

CROSS-REFERENCE TO RELATED APPLICATIONS

This application is a Continuation of U.S. application Ser. No. 17/946,778 filed on Sep. 16, 2022, which is a Continuation of PCT/EP2021/056718, filed Mar. 16, 2021, which claims benefit of priority to Denmark application PA 2020 70172, filed Mar. 17, 2020, the entire disclosures of which are hereby incorporated herein by reference.

TECHNICAL FIELD

The invention relates to production of microfluidic devices, microfluidic devices, systems and performance of determinations using microfluidic devices. More specifically the invention relates to a method and a system for performing a plurality of inorganic determinations as well as a microfluidic device suitable for performing a chemical test and a method of producing the microfluidic device.

BACKGROUND ART

Many different types of microfluidic devices have been developed specifically for application within diagnostic tests. This include for example the lateral flow type microfluidic device and the flow-through type microfluidic device in which flow of fluid occurs by wicking through a porous membrane r laterally and/or transversely. Such system comprises the wicking membranes, usually in for of strips located on a support and e.g. encased in a housing, which may be shaped to form a channel. Another type of microfluidic devices is the type where a micro channel is formed between layers of solid material, and wherein most of the length of the channel is free of wicking material. In the latter type, it may be advantageous to have a reagent located at a selected site in the channel.

There is a need in the art to develop new method for effective production of such microfluidic devices. In addition there is a need for development of develop microfluidic devices with desired reagents for performing chemical assays.

Chemical tests of the surrounding nature has been more and more necessary in recent years, both due to monitoring or testing for pollution and in order to ensure a desires amount of nutrient in soil or surface water, such as lakes and rivers.

For many years, such tests have been performed by withdrawing samples from the soil or surface water, transporting the samples to a laboratory and performing traditional chemical analysis, such a Kjeldal analysis for nitrogen determination. Development of assays using expensive apparatus such as elemental analyzers, plasma optical emission spectrometry and/or mass Spectrometers has made such analysis much faster.

Another technology that has been developed is the use of colometric assays for inorganic as well as organic analysis. Most organic and inorganic compounds in soil and water are colorless and undetectable to the human eye. Testing with a colorimeter introduces chemical reagents and light providing a way to "see" these invisible compounds.

Cade-Menun et al. Geochem Trans (2018) 19:7 https://doi.org/10.1186/s12932-018-0052-9 "Characterizing the phosphorus forms extracted from soil by the Mehlich III soil test", discloses an analysis of different methods of determining phosphorous in soil. Soil tests estimate plant-available P indirectly, supported by correlations between soil P test values and crop yields.

CN202330288 discloses a colorimetric and turbidimetric test kit for soil fertility evaluation. The colorimetric and turbidimetric test kit comprises a test card with a number of colorimetric sub-regions each colorimetric sub-region contains at least three different color areas with color changing from light to dark. Easily soluble and easily-reactant liquid or powdery chemical reagents are held in the test kit. The liquid reagents are packaged in long soft plastic quantitative dropping bottles, which are attached with different patterns or characters for indicating orders, and the powdery reagents are packaged in cover-type capsules in different colors. The colorimetric and turbidimetric test kit for soil fertility evaluation can simply, conveniently and rapidly detect the content levels of main fertilizers and is used for guiding the rational application of fertilizers.

However, there is still a need for test systems that are simple to use, low cost and where a plurality of teats may be provided simultaneously.

DISCLOSURE OF INVENTION

An objective of the present invention is to provide a fast and reliable method for performing a plurality of inorganic determinations of a sample for example of environmental matter, such as a soil sample or a surface water sample.

In an embodiment, it is an objective to provide a fast and inexpensive method for performing a plurality of inorganic determinations of a sample, wherein the method is both fast and inexpensive.

In an embodiment, it is an objective to provide a fast and reliable system for performing a plurality of inorganic determinations of a sample, such as a sample of environmental matter e.g. a soil sample or a surface water sample or a biological matter e.g. urine or an industrial matter e.g. wastewater.

In an embodiment, it is an objective to provide a method of producing a microfluidic device, which is fast and may be performed at relatively low cost.

In an embodiment, it is an objective to provide a microfluidic device, which is relatively inexpensive and may be produced to have a high quality.

These and other objects have been solved by the inventions or embodiments thereof as defined in the claims and as described herein below.

It has been found that the inventions or embodiments thereof have a number of additional advantages, which will be clear to the skilled person from the following description.

The term "inorganic determination" does not exclude determining an amount of an inorganic element and/or component and correlating the determination to an amount of an organic compound.

The term "environmental matter" means any matter that is found in nature, such as soil, surface water (e.g. from lakes, waterways, rivers . . . ), ground water.

The term "biological matter" means any matter with biological origin, such as any sample from living organisms.

The term "industrial matter" means any matter processed or used in an industrial production or treatment, such as wastewater.

The term "substance" is used to designate any matter that uncountable i.e. not in the form of distinct items. The substance may comprise a homogeny or inhomogeneous mixture of components and/or elements.

The term "dry buffer" means one or more dry chemicals, which upon aqueous dissolution to a selected concentration forms a buffer of a selected pH value. Unless otherwise specified the pH value is the pH value at 20° C. and at a selected concentration or range of concentration. The pH value of a buffer is the value where the buffer capacity is at maximum, i.e. where pH=pKa value.

The term "inorganic units" means any inorganic molecule, inorganic element, inorganic ion, inorganic compound or clusters comprising any of these.

The terms "test" and "assay" are used interchangeable.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Reference made to "some embodiments" or "an embodiment" means that a particular feature, structure, or characteristic described in connection with such embodiment(s) is included in at least one embodiment of the subject matter disclosed. Thus, the appearance of the phrases "in some embodiments" or "in an embodiment" in various places throughout the specification is not necessarily referring to the same embodiment(s). Further, the skilled person will understand that particular features, structures, or characteristics may be combined in any suitable manner within the scope of the invention as defined by the claims.

The term "substantially" should herein be taken to mean that ordinary product variances and tolerances are comprised.

Throughout the description or claims, the singular encompasses the plural unless otherwise specified or required by the context.

All features of the invention and embodiments of the invention as described herein, including ranges and preferred ranges, may be combined in various ways within the scope of the invention, unless there are specific reasons not to combine such features.

In an aspect, the invention comprises a method of performing a plurality of inorganic determinations of preselected matter, such as of environmental matter e.g. a soil sample or a surface water sample or a biological matter e.g. urine or an industrial matter e.g. wastewater.

The method comprises preparing an aqueous sample from the preselected matter and performing an assay comprising at least two quantitative inorganic colorimetric determinations of respective preselected inorganic units or compounds thereof, of at least a liquid portion of the sample, wherein the at least two inorganic colorimetric determinations is performed at different preselected pH values.

The colorimetric determinations comprises providing a microfluidic device, wherein the microfluidic device feeding the sample into the inlet of the microfluidic device comprises at least one microfluidic furcated channel arrangement comprising an inlet and at least a first branch and a second branch, each branch comprises a first reaction site and a second reaction site in flow direction further from the inlet than the first reaction site. Thus, the first reaction site is downstream to the inlet and the second reaction sited is downstream to the first reaction site.

The first reaction site of the first branch comprises a first dry buffer having a first pH value upon aqueous dissolution and the first reaction site of the second branch comprises a second dry buffer having a second pH value upon aqueous dissolution and wherein each of the second reaction sites comprises respective colorimetric reaction agents.

The method comprises feeding the sample into the inlet of the microfluidic device and allowing respective portions of the sample dissolving respectively the first and the second buffers and thereafter providing respective color reactions by reacting with the respective colorimetric reaction agents. Reading at least one color parameter of each of the respective color reactions and correlating the respective read color parameters to respective standard curves each representing color parameter relative to content of the respective preselected inorganic unit or compounds(s) thereof.

The method of performing a plurality of inorganic determinations of preselected matter has shown to be very fast, effective and relatively low cost. By performing two of more buffer controlled determinations using the same microfluidic device and adding the sample in a common inlet the method has shown to be surprisingly effective. Heretofore it has never been considered performing several buffer controlled assays in the same microfluidic device. It has shown that the buffers dissolves and very fast tune into the preselected pH value for performing determinations of very high accuracy.

Advantageously a reaction site and/or read out site comprises a length section of the channel, which may in an embodiment, be enlarged to form a chamber—also referred to as a reaction chamber—such as a chamber with a round or oval shape seen in top view of the microfluidic device orthogonal to the flow direction of the microfluidic channel arrangement.

The reaction chamber may advantageously have a width, which is at least about 50% wider than a channel leading to or from the reaction chamber, such as preferably at least about 100%, such as at least about 200% wider than the channel leading to or from the reaction chamber.

In an embodiment, the matter is environmental matter, preferably selected from soil, water, leaf, plant tissue like stems and buds.

In an embodiment, the matter is water, such as industrial wastewater, drinking water, surface water or ground water.

In an embodiment, the matter is urine or plasma.

Where the preselected matter is a liquid substance, the preparation of the aqueous sample simply comprises withdrawing a portion of the preselected matter. The withdrawn portion of the liquid substance may e.g. be concentrated or diluted depending on the expected content of the inorganic unit(s) tested. Such dilution or concentration of samples is common practice for a skilled person.

In an embodiment, the method comprises adding surfactant to the sample prior the withdrawn portion prior to feeding the sample thereof into the inlet of the microfluidic device.

It has been found that by ensuring that the sample comprises a surfactant, the walls of the channels of the channel arrangement becomes much simpler to wet as the sample flow into the channel even where the walls of the channel has a low surface tension and/or are hydrophobic. Hence, the surface of the channel wall need not be pretreated to become hydrophilic. This is a further advantageous cost saving.

The surfactant is advantageously selected such that it does not interfere with the determinations performed. Advantageously the surfactant is a nonionic surfactant. The amount of surfactant requires is very small, for example one drop (50 μL) to 1-25 mL of sample may be sufficient.

The addition of the surfactant to the sample is especially advantageous where the surfaces or part of the surfaces of the channel has a low surface tension and/or are hydrophobic.

Where the preselected matter comprises or is a solid substance, the preparing of the aqueous sample preferably comprises withdrawing a portion of the environmental matter, subjecting the portion of environmental matter to an extracting process comprising mixing the sample with a predetermined amount of an aqueous extracting solvent, and filtering off solid parts.

Where the portion of preselected matter is relatively hard and not simple to mix with the aqueous extracting solvent, the preparing of the aqueous sample may comprise crushing and/or milling the portion of environmental matter. This crushing and/or milling may be performed using any method such as using a mill with a preselected grain size.

The extracting process advantageously comprises shaking or stirring the mixture of the portion of environmental matter and the aqueous extracting solvent for a preselected period preferably of from about 5 seconds to about 20 minutes, such as from about 10 seconds to about 5 minutes.

Advantageously, the aqueous extracting solvent is or comprises water. In an embodiment the extracting solvent comprises a surfactant e.g. for the reason as described above for preselected liquid matter.

In an embodiment, the aqueous extracting solvent comprises one or more surfactants and or one or more acids, such as one or more organic acids.

Examples of suitable acids include oxalic acid, malic acid, acetic acid and citric acid.

In an embodiment, the extraction solvent is one of the standard extraction solvents Melich 3, Olsens extract, Morgans extract or Bray-1 extract:

TABLE-US-00001 Bray 1-P Extract (Bray & 0.025M HCl; 0.03M NH.sub.4F Kurtz, 1945) Mehlich-3 Extract (Mehlich, 0.2M acetic acid; 0.25M NH.sub.4NO.sub.3; 0.015 NH.sub.4F; 1984) 0.013M HNO.sub.3; 0.001 M EDTA Olsen Extract (Olsen et al., 0.5M NaHCO.sub.3 1954) Morgans Extract sodium acetate buffered at pH 4.8 or ammonium acetate buffered at pH 4.8 (modified)

An example of a suitable extracting solvent is polysorbate 20, 80 (surfactant) added to an organic acids mixture containing oxalic acid, malic acid and citric acid.

The extraction solvent is advantageously selected depending on the solid matter and the inorganic determinations to be performed. For example if the method is directed to determine the content of sodium, the extracting solvent should advantageously be essentially free of sodium and etc.

In an embodiment, the inorganic colorimetric determinations comprise a determination of at least one of the inorganic units; ammonium, nitrate, nitrite, potassium, phosphorous. orthophosphate, magnesium, calcium, sodium, sulfur, sulphite, manganese, iron, boron, lead, nickel, cadmium, copper, chromium, cobalt, arsenic, zinc, chlorine, tin, zinc, mercury, molybdate or any derivatives thereof or precursors therefore.

The filtration may be performed by any means, but to ensure not to block the channel arrangement it is desired that the filter used for filtration has a cut of size which is about 0.5 times or less, such an 0.1 times or less the smallest cross-sectional dimension of the channel arrangement downstream to the reaction channel.

Advantageously the portion of the aqueous sample fed to the inlet is essentially free of solid matter.

The portion of the aqueous sample fed to the inlet may be very small. Thus, very accurate determinations may be obtained using very small samples, this may be very advantageously where the amount of sample is limited, e.g. where the preselected matter is wound secrete or nectar. Advantageously the volume of sample fed to the inlet of the microfluidic device is at least about 10 μL such as from about 25 μL to about 500 μL, such as from about 50 μL to about 500 μL.

Advantageously the microfluidic furcated channel arrangement comprises channels sufficiently small to capillary drive an aqueous sample. Preferable the channels has at least one cross-sectional dimension, such as a height dimension or a width dimension, which is between 50 μm and 1 mm, such as between 100 μm and 0.8 mm, such as between 0.1 mm and 0.5 mm.

Width of the channel may advantageously varies from about 100 μm to about 500 μm.

The dry buffers may in principle have any pH value selected in dependence of the assay to be performed. In an embodiment, the at least buffers are selected from buffers, which upon aqueous dissolution have pH values in the interval from about 1 to about 13. Preferably, the pH values of the respective buffers are selected to ensure a desired form of the respective inorganic unit to be determined.

In an embodiment, the at least buffers are selected from buffers, which upon aqueous dissolution have pH values in the interval from about 1 to about 11, such as a pH value of 6.5 for potassium determination, a pH value of 6 for nitrate determination, a pH value of 13 for ammonium determination and/or a pH value of 1 for orthophosphate determination.

It has been found that the two or more buffers in the respective first reaction sites of the microfluidic furcated channel arrangement of the microfluidic device may differ very much from each other without this different buffers affects or migrated to each other. Hence, several assays (determinations) requiring different pH value may be performed simultaneously in the same microfluidic device.

In an embodiment the dry buffers comprises buffers which upon aqueous dissolution differs at least about 0.1 in pH value, such as at least about 0.2 in pH value, such as at least about 0.3 in pH value, such as at least about 0.4 in pH value, such as at least about 0.5 in pH value, such as at least about 1 in pH value.

In an embodiment the dry buffers comprises buffers which upon aqueous dissolution differs at least about 2 in pH value, or even 3, 4, or 5 in pH value.

The dry buffers may for example comprise buffers comprising one or more of citrate buffer, sodium hydroxide buffer, potassium hydroxide buffer, PBS buffer and/or one or more of the buffers of Good's buffers or any modifications thereof.

Example of buffers includes citrate buffer with citric acid and sodium citrate; goods buffers and/or a mixture of sodium monobasic potassium, citric acid and boric acid.

The preparation thereof may include the dissolution of salts in to deionized water and adjusting the pH Examples of very suitable buffers are the good's buffers: https://www.sigmaaldrich.com/life-science/biochemicals/biochemical-products. html?TablePage=14572938

In an embodiment, the buffer comprises an aqueous solution consisting of a mixture of a weak acid and its conjugate base, or vice versa. Its pH changes very little when a small amount of strong acid or base is added to it. Buffer solutions are used as a means of keeping pH at a nearly constant value in a wide variety of chemical applications.

In a preferred embodiment, at least one of the colorimetric reaction agent is provided by a membrane impregnated with an ionophore cocktail. An ionophore cocktail comprises at least one ionophore. In an embodiment, the ionophore cocktail comprises two or more different ionophores.

The membrane may be a support disc as described further below.

Advantageously the membrane with the ionophore cocktail is in the form of a reagent disc as described further below and the microfluidic device comprising the furcated channel arrangement may be produced according to the method described below.

In an embodiment, the ionophore cocktail is a mixture of chemicals, comprising an ionophore. The ionophore is advantageously an ionophore for a target ion of the inorganic unit to be determined. Preferably, the ionophore is specific for the target ion.

In an embodiment, the target ion of the inorganic unit to be determined is NH.sup.4+, K.sup.+, (NO.sub.3).sup.−, (NO.sub.2).sup.−, (PO.sub.4).sup.3−, Mg.sup.2+, Na.sup.+, Cl.sup.−, Zn.sup.2+, Cr.sup.3+, Sb.sup.3+, SbO.sup.+, Fe.sup.2+, Cd.sup.2+, B.sup.3+, Ni.sup.2+, Pb.sup.2+, As.sup.3+, Co.sup.2+ and/or Co.sup.3+. Advantageously, the ionophore may be raised against one or more of the mentioned ions may.

In an embodiment, the ionophore is an ionophore for (NO3)−, preferably selected from selected from tetradodecylammonium nitrate (TetraDDA), Tridodecylmethylammonium nitrate (TriDDA, methyltridodecylammonium chloride (MTDA), 9,11,20,22Tetrahydrotetrabenzo[d,f,k,m][1,3,8,10]tetraazacyclotetradecine10, 21-dithione (CAS No.: 221011-41-2), 9-Hexadecyl-1,7,11,17-tetraoxa-2,6,12,16-tetraazacycloeicosane, Methyltridodecylammonium nitrate; (TDMA-NO.sub.3), Tridodecylmethylammonium nitrate, Tetraoctadecylammonium bromide or any combinations comprising any of these.

In an embodiment, the ionophore is an ionophore for NH.sup.4+, preferably selected from nonactin, enniatin, or any combination comprising one or more of these.

In an embodiment, the ionophore is an ionophore for K.sup.+, preferably selected from valinomycin, lasalocid, salinomycin, Potassium ionophore-BME 44 (2-Dodecyl-2-methyl-1,3-propanediyl bis[N-[5'-nitro(benzo-15-crown-5)-4'-yl]carbamate], BME 44), Bis[(benzo-15-crown-4)-4'-ylmethyl]pimelate, 4-tert-Butyl-2,2,14,14-tetrahomo-2a,14a, dioxacalix[4]arene-tetraacetic acid tetra-tert-butyl ester or any combinations comprising any of these.

In an embodiment, the ionophore is a ionophore for (PO.sub.4).sup.3−, preferably comprising 9-Decyl-1,4,7-triazacyclodecane-8,10-dione.

Ionophore containing membranes are well known in the art and are often referred to as ion-selective electrodes, because they have generally been developed and used in electrical sensors e.g. for measuring pH value for example in soil. It has also been attempted to develop, ion-selective electrodes for nitrate and potassium determination in soil. Hak-Jin Kim, John W. Hummel, Stuart J. Birrell "Evaluation of Nitrate and Potassium Ion-Selective Membranes for Soil Macronutrient Sensing". Agricultural and Biosystems Engineering. Publications Vol. 49(3): 597-606 (2006) http://lib.dr.iastate.edu/abe_eng_pubs/556.

Ionophore cocktails are commercially available e.g. from Merck.

Heretofore it has never been considered using ionophore technology for test in a microfluidic device using optical read out. For the ionophore reaction, an accurate buffering is required and an incorrect buffer concentration may result in measuring errors. Hence, it could not have been predicted that the ionophore technology could be applied in a microfluidic device with high accuracy, and in particular, where the buffer is applied as a dry buffer and the determination is based on a color change.

Advantageously, the ionophore cocktail comprises a color former, such as a dye or chromogenic compound, which ensures a color change upon reaction between the ionophore and the target ion. Preferably, the color former is subjected to a color generation and/or a color change upon the reaction between the ion and the ionophore.

When the liquid (containing the chemical to be measured) is exposed to the ionophore membrane, the ionophore reversible binds to the ion and releases H+ (proton) which causes a change in the pH of the membrane. This causes the pH sensitive dye or chromogenic compound to change color.

Advantageously, the color former comprises a chromogenic compound and/or a ionophore reaction sensitive dye, such as a pH sensitive dye, a potential sensitive dye, preferably the color former comprises at least one of Fluorescein octadecyl ester, Nile Blue, 3,6-Didodecyloxy-4,5-dimethyl-o-phenylene-bis(mercury chloride), ETH 9033, 4-[4-(Dioctylamino)-phenylazo]-3-nitro-benzaldehyde, Chromoionophore CR-514, 9-Dimethylamino-544-(16-butyl-2,14-dioxo-3,15-dioxaeicosyl)phenylimino]benzo[a]phenoxazine, ETH 2439, 9-(Diethylamino)-5-[(2-octyldecy)imino]benzo[a]phenoxazine, ETH 5350, 4',5'-Dibromofluorescein octadecyl ester, ETH 7075, 3',3",5',5"-Tetrabromophenolphthaleinethyl ester, TBPE, 4-Dibutylamino-4'-(trifluoroacetyl)stilbene, ETH 4003 or any combination comprising one or more of these.

In an embodiment, the color former is a chromogenic ionophore also referred to as a chromoionophore. This means that the ionophore and the color former may be included in a single component. The chromoionophore comprises a chromophoric moiety and an ionophoric moiety, where the ionophoric moiety interacts with the target ions present in the sample, resulting in the chromophoric moiety changing its radiation absorption properties e.g. in the ultraviolet and/or the visible regions of the spectrum. For example, a change in an intensity of an absorption maximum may be measured and the ion concentration may be determined accordingly.

The chromophoric moieties can be a nitro-substituted styryl or phenylazo, substituted thiazolevinyl or thiazoleazo, substituted naphthothiazolevinyl or naphthothiazoleazo, substituted naphthylvinyl or naphthylazo, substituted quinolinovinyl or quinolinoazo and their quarternized salts.

Nile blue is used for histological staining of biological preparations. It highlights the distinction between neutral lipids (triglycerides, cholesteryl esters, steroids) which are stained pink and acids (fatty acids, chromolipids, phospholipids) which are stained blue.

Nile blue may form a moiety of a chromoionophore, such as 3-Octadecanoylimino-7-(diethylamino)-1,2-benzophenoxazine, 9-(Diethylamino)-5-(octadecanoylimino)-5H-benzo[a]phenoxazine, N-Octadecanoyl-Nile blue, ETH 5294.

Advantageously the ionophore additionally comprises a plasticizer and/or a salt exchanger.

The membrane may advantageously comprises a polymer, such as a biopolymer. Examples of membranes comprise or are of one or more of the materials polyvinylchloride (PVC), polyvinylalcohol (PVA), polyvinylbutyral (PVB), polyvinylpyrrolidone (PVP), cellulose, nitrocellulose, nylon, gelatin, silk and/or chitosan.

The membrane advantageously has a thickness from a few nm to 0.5 mm, such as from about 10 nm to about 10 μm.

In an embodiment, the membrane is polymeric membrane formulated with an ionophore cocktail comprising a chromoionophore and/or an ion specific ionophore and a color former in an organic solvent.

Examples of organic solvents are tetrahydrofuran (THF), acetonitrile, dimethylformamide, propylene carbonate, dichloromethane, and any combinations comprising at least one of these.

In an embodiment, the at least one of the first and the second branches comprises at least one additional reaction site and/or an additional read out site.

Advantageously the second reaction site also forms the read out site. Alternatively, one or both of the first and second branches may comprise an additional read out site. The additional read out site is advantageously located downstream from the second reaction site.

The at least one additional reaction site may be locates at any position between the inlet and the read out site.

The color parameter may be any color parameter, which may be read out from the microfluidic device. In an embodiment, the color parameter comprises a color spectrum of a fraction thereof such as an intensity parameter, such as an intensity versus wavelength parameter, such as a hue parameter, such as a peak wavelength or peak wavelength range.

The color parameter may represent a ratio of activities of chromoionophores and/or ionophore versus. The concentration of the target ion of the inorganic unit and/or in the sample.

The assay is very fast, and it is desired that the method comprises allowing the sample to react with the colorimetric reaction agent for a period of from about 1 seconds to about 10 minutes, such as about 10 seconds to about 5 minutes prior to reading.

The reaction time is advantageously preselected, such that same reaction time is applied for the test of the inorganic determinations as for the respective reference curves as for the reference test samples.

The two or more quantitative inorganic colorimetric determinations may require different reaction time. In an embodiment, it may be desired to design the microfluidic device such that even where the two or more quantitative inorganic colorimetric determinations may require different reaction time, the two or more tests may be read out simultaneously. This may for example be provided by adjusting the length and/or dimension and/or hydrophilicity/hydrophobicity of the channel arrangement. In an embodiment, the channel arrangement comprises one or more passive capillary stops, e.g. comprising abruptly channel geometry changes.

In an embodiment, the method comprises performing at least one additional determination, wherein the microfluidic device comprises an additional branch downstream from the inlet for each additional determination and wherein each additional branch comprises at least one reaction site comprising an additional colorimetric reaction agent and the method comprises reading out from the additional colorimetric reaction agent after the sample has wetted the additional colorimetric reaction agent. The additional determination and the chemical(s) for the additional determination may be any type of determination organic as well as inorganic.

In an embodiment, the additional determination(s) is/are inorganic determination(s).

In an embodiment, the additional colorimetric reaction agent comprises diphenylthiocarbazone (for lead detection), 2,2'-Bipyridy (for Iron (II) detection), molebdate (for orthophosphate and/), combined with leucomalachite green dye (for arsenic detection).

The colorimetric method is based on the reaction of arsenic (III) with in acid medium to liberate iodine, which oxidizes leucomalachite green to malachite green. A rapid color development was observed after the addition of the dye.

Advantageously the method comprises generating at least one of the standard curves. The method of generating the standard may comprise

- preparing a plurality of aqueous reference samples with different and known concentrations of preselected inorganic unit,
- preparing a reference microfluidic device corresponding to or identical to the microfluidic device for each reference sample,
- adding respective reference samples to respective microfluidic devices and allowing the respective reference sample to react with respective colorimetric reaction agents providing respective color reactions
- reading out at least one color parameter of each of the respective color reactions and
- performing a linear regression including points of respective pairs of color parameter(s) and corresponding, known concentrations of preselected inorganic unit.

The standard curve may be stored on a computer optionally in data communication with a reader as further described below.

The aqueous reference samples are advantageously prepared by a method which is substantially equal to the preparation of the aqueous sample from the preselected matter of which the inorganic determinations are to be performed and the aqueous reference samples are prepared from reference matter of the same type of the preselected matter to be tested. Hence, if the matter is soil, the reference matter is advantageously also soil and etc.

In an aspect, the invention comprises a method of producing a microfluidic device. The method comprises

- providing at least two solid layers
- stacking the at least two layers to form a microfluidic channel arrangement comprising at least one opening into a channel of the microfluidic channel arrangement,
- wherein the method further comprises producing at least one reagent disc and arranging the reagent disc between the at least two solid layers to provide that at least a portion of the reagent disc is located in the microfluidic channel arrangement, wherein the reagent disc comprises a support disc carrying at least one dry reagent.

This method has been found to be very fast and cost effective. By applying the chemical(s) into the microfluidic channel arrangement in the form of a reagent disc, the reagent disc may be prepared prior to preparation of the microfluidic device, This means that the drying time required in the preparation of the reagent discs does not delay the production of the microfluidic device, since the reagent disc may be pre-prepared.

This makes the production of the microfluidic device much more flexible. The reagent disc may be applied in the microfluidic channel arrangement in a very simple way. For example, it is very simple to apply several equal or different reagent disc in a microfluidic channel arrangement.

Advantageously, the channel is free of any other wicking material except for any wicking material that may be comprises in the one of more reagent discs.

Preferably, at least a section of the microfluidic channel arrangement immediately upstream to the location of the reagent disc is free of absorbent and/or wicking material.

It is generally desired that the microfluidic channel arrangement is free of wicking materials and/or other porous materials than what may be included in the one or more reagent disc. Advantageously, at least 50% of the length of the microfluidic channel arrangement is free of wicking materials and/or other porous materials. Preferably, at least 80% by length, such as at least 90% by length of the microfluidic channel arrangement is free of wicking materials and/or other porous materials. Thereby the test liquid may be flowing very fast to reach the reagent disc. The microfluidic device may for example comprise several reagent discs located in separate branches of the microfluidic channel arrangement and by feeding the test liquid at a common inlet of these reagent discs which may in addition differs with respect to reagents, such that different assays may be performed simultaneously in a very simple and cost effective manner.

The support disc may be of any material capable of supporting the chemical(s) for the reagent disc.

The support disc may advantageously have a mean pore size of 1 μm or less, such as a mean pore size of 0.8 μm or less, such as a mean pore size of 0.5 μm or less.

Example of support discs comprises a paper disc, a polymer disc or a combination thereof. The support disc may have one or more layers, such as two layers or more.

In an embodiment, the reagent disc comprises a membrane comprising a polymer, such as a biopolymer, preferably the membrane comprises or is of one or more of the materials polyvinylchloride (PVC), polyvinylpyrrolidon, polyvinylalcohol (PVA), polyvinylbutyral (PVB), polyvinylpyrrolidone (PVP), Polyethylene terephthalate (PET), cellulose, nitrocellulose, nylon, gelatin, silk and/or chitosan.

As it will be explained further, the method provides a very effective way of mounting the reagent disc in the microfluidic channel arrangement. This provides that the reagent discs may be relatively small while still ensuring a effective method of producing the microfluidic device.

The support disc may in addition be relative thin, such as with a thickness of 1 mm or less, such as a thickness of 0.9 mm or less, such as a thickness of 0.5 mm or less.

The reagent discs may advantageously be produced be a method comprising producing the reagent disc(s) comprises

- providing a support structure,
- adding a solution comprising at least one reagent,
- drying the solution and
- cutting the reagent disc (s) from the support structure carrying the dried reagent.

Thereby a large number of reagent disc may be produced in a very simple and effective way.

The term "reagent" means any chemical or combination of chemicals.

The addition of the solution comprising the at least one reagent may be performed by any deposition technique. Preferably, the addition of the solution comprises spinning, printing, dipping, spraying, painting, dripping or any combination comprising at least one of these deposition techniques.

The preferred deposition technique depends on how much chemical and/or how accurate amount of chemical is to be deposited.

In an embodiment, the method comprises adding two or more layers comprising reagent(s).

In an embodiment, the method comprises adding two or more different layers comprising reagent(s).

In an embodiment, one layer comprising reagent(s) comprises a buffer and another layer comprising reagent(s) comprises a reactant for a target unit, such as a target organic or inorganic molecule or ion. Thereby the sample may be buffered simultaneously with performing a reaction with the reagent(s).

The least one reagent comprises an ionophore and/or a color former e.g. an ionophore cocktail as described above.

In an embodiment, the support structure comprises one or more layers, such as one or more paper layers and/or one or more polymer layers, such as biopolymer layers.

The support structure may e.g. be supplied in rolls or in sheets, such as sheets with dimensions corresponding to at least 10, such as at least 20, such as at least 50, such as at least 100 reagent discs, such as 1000 reagent discs or more.

In an embodiment, the support structure has a front side and a rear side. The solution may be deposited on one or both of the sides. In an embodiment, the addition of the solution comprising the at least one reagent, comprises depositing the solution onto the front side of the support structure. In an embodiment, the support structure comprises an adhesive at its rear side.

The adhesive makes is much simpler to mount the reagent disc in the microfluidic channel arrangement and the reagent disc may be located much more accurate than without the adhesive.

In an embodiment, microfluidic channel arrangement comprises an adhesive, such as a hydrophilic adhesive and the reagent disc is mounted onto the adhesive of the microfluidic channel arrangement.

The term hydrophilic means herein that pure water will form an angle θ with the surface of <90° determined a 23° C. and 1 atmosphere.

The hydrophilic surface may advantageously have a contact angle θ to water of 80° or less, such as of 70° or less, such as of 60° or less.

The hydrophilic surface may advantageously have a surface tension higher than the surface tension of pure water determiner at 23° C., such as a surface tension at least 10% higher than the surface tension of pure water determiner at 23° C.

In an embodiment, the stacking of the at least two solid layers to form the microfluidic channel arrangement comprising providing at least one of the solid layers with a hydrophilic surface and stacking the solid layers to provide that the hydrophilic surface forms a surface of the channel of the microfluidic channel arrangement. Advantageously the step of providing the at least one solid layer with a hydrophilic surface comprises applying a hydrophilic adhesive to the surface, such as a pressure sensitive, hydrophilic adhesive.

Where the support structure comprises an adhesive the adhesive is advantageously a protective peel-off slip-layer.

The adhesive may advantageously be a pressure sensitive adhesive such as an acrylic adhesive.

The cutting of the reagent disc(s) from the support structure may be performed by any suitable way, e.g. using methods, which are known from industrial paper and/or polymer cutting.

In an embodiment, the cutting of the reagent disc(s) from the support structure carrying the dried reagent is performed by a method comprising stamping, laser cutting, slitting and/or any combinations comprising one or more of these.

Where the adhesive is covered by a protective peel-off slip-layer, the cutting of the reagent disc(s) from the support structure carrying the dried reagent, may advantageously comprise cutting through the support structure without cutting through the protective peel-off slip-layer. Thereby the reagent discs may be supported by the peel-off slip-layer and may be taken one-by-one to be mounted onto a microfluidic channel arrangement.

Advantageously, the method comprises stamping out the reagent discs in the form of round, such as oval or circular reagent discs, without stamping through the protective peel-off slip-layer.

In an embodiment, the method comprises cutting a plurality of reagent discs from the support structure, such as cutting at least 10, such as at least 20, such as at least 50, such as at least 100 reagent discs from the support structure.

In an embodiment, the cutting of the reagent discs from the support structure carrying the dried reagent, comprises cutting the support structure in first cuts, wherein the first cuts comprises cutting lines crossing fully through the support structure and optional protective peel-off slip-layer, from edge to edge of the support structure.

The cutting of the reagent disc(s) from the support structure carrying the dried reagent, may further comprise cutting the support structure in second cuts, wherein the second cuts define defines the reagent disc optionally in combination with the first cuts. The second may e.g. cut reagent discs to have round or oval periphery or the first and the second cuts may together cut reagent discs to have square or rectangular periphery.

Advantageously, the second cuts is crossing fully through the support structure, but not cutting fully trough the protective peel-off slip-layer. Thereby the reagent discs are supported by sections of the peel-off slip-layer cut by the first cuts. In an embodiment the first cuts comprises cutting the support structure in strips. Thereby lines of the reagent discs are supported by the strips of the peel-off slip-layer cut by the first cuts.

In an embodiment, the first cuts and the second cuts are performed simultaneously, or the first cuts are performed after the second cuts.

The stack of solid layers may be mechanically held together and/or they may be fully or partly interfacially adhered.

In an embodiment, the at least two solid layers comprises at least three layers, such as at least four layers, such as up to 10 layers.

In an embodiment, the method comprises providing one or more of the at least two solid layers to comprises one or more cutout and/or one or more carvings forming the microfluidic channel arrangement.

In an embodiment, the stack of solid layers comprises a plane bottom layer with a top side carrying an adhesive, a middle layer and a plane top layer with a bottom surface carrying an adhesive. The middle layer comprises carvings or cuts for forming the microfluidic channel arrangement when the middle layer is sandwiched between the top and the bottom layer. This method makes it very simple to produce the microfluidic device.

Advantageously the microfluidic channel arrangement is provided to have at least one reaction site, wherein the method comprises arranging the at least one reagent disc to be located at the reaction site.

The reaction site may be a length section of the microfluidic channel arrangement. In an embodiment, the reaction is a reaction chamber of the microfluidic channel arrangement, such as a reaction chamber with a substantially round or oval shape, e.g. with a width of from about 2 mm to about 2 cm, such as from about 3 mm to about 1 cm.

In an embodiment, at least one of the at least two solid layers forming the channel comprises a polymer surface formed of polymer material, such as polyester and the method of arranging the reagent disc between the at least two solid layers comprises positioning the reagent disc onto the polymer surface of the at least one solid layer and applying another of the at least two solid layer to cover the reagent disc.

Examples of solid layers includes the 3M™ Microfluidic Diagnostic Film 9960 and 9962 and the 3M™ 9984 Diagnostic Microfluidic Surfactant Free Fluid Transport Film.

In an embodiment, at least one of the at least two solid layers forming the channel comprises an adhesive surface formed of a pressure sensitive adhesive, such as a polymer containing emulsion, wherein the arrangement of the reagent disc between the at least two solid layers comprises positioning the reagent disc onto the adhesive surface of the at least one solid layer and applying another of the at least two solid layer to cover the reagent disc.

The pressure sensitive adhesive may be hydrophobic or hydrophilic.

The pressure sensitive adhesive may advantageously form a hydrophilic surface. This is especially desired where no other surface areas of the microfluidic channel arrangement are hydrophilic.

Advantageously, at least one of the layers on the microfluidic device should have a hydrophilic surface e.g. provided by a hydrophilic adhesive. Thereby a very fast and uniform flow may be obtained.

In an embodiment, at least one of the solid layers is a polyester sheet adhered with a single sided or with a double sided hydrophilic adhesive tape of for example Poly (sodium methacrylate, methylmethacrylate) blended with PVP.

In an embodiment, at least one of the solid layers is a hydrophilic PMMA layer.

Advantageously, the step of arranging the at least one reagent disc comprises using a computer controlled micropositioning stage, capable of generating mechanical motion with micrometer or nanometer resolution. Such stages are known from MEMS fabrications.

A major development in nanopositioning has been the use of microelectromechanical systems (MEMS) fabrication processes to produce microscale nanopositioners. These MEMS-based devices are conceptually similar to their macroscale counterparts, typically comprising an end effector, actuators, sensors, and suspension structures. However, MEMS nanopositioners potentially offer additional significant advantages as a result of their microfabricated nature, including a much smaller footprint, higher bandwidth, batch manufacturability, and potential for integration with electronic circuits.

In an embodiment, the reagent disc has an adhesive at its rear side and the method comprising adhering the rear side of the reagent disc to one of the solid layers.

In an embodiment, one of the solid layers comprises an adhesive and the method comprises adhering the rear side of the reagent disc to the solid layer, wherein the reagent disc may or may not have an adhesive at its rear side.

Advantageously, the at least one reagent disc is adhered to the solid layer to provide that at least a portion of the reagent disc is located in a reaction chamber of the microfluidic channel arrangement.

The method may comprise locating two or more reagent discs in the microfluidic channel arrangement, wherein the two or more reagent discs are located in same or different reaction chambers. Where the method comprises locating two or more reagent discs in a common reaction chamber of the microfluidic channel arrangement, the two or more reagent discs may be located on top of each other and/or laterally to each other.

Thereby several reagent discs with different reagents may be located in a common reaction chamber. For example, one of the reagent disc carries a dry buffer and another one of the reagent disc carries an ionophore cocktail, e.g. an ionophore cocktail as described above.

Advantageously, the at least one reagent disc is impregnated with an ionophore cocktail to form a membrane with an ionophore, such as the ionophores described elsewhere herein.

The at least one reagent disc may be impregnated with chemicals (dry buffer) which upon aqueous dissolution form a buffer, such as the dry buffers described above.

The at least one reagent disc may comprise a color former, such as a chromogenic compound, e.g. a color former as described above.

The at least one opening into the microfluidic channel arrangement may comprise an inlet and/or a gas escape opening.

In an embodiment, the microfluidic channel arrangement comprises at least one microfluidic furcated channel branching at least a first branch and a second branch such as the microfluidic furcated channel described above.

Each of the first branch and second branch may comprise a first reaction site downstream from the inlet and a second reaction site downstream from the first reaction site and advantageously a first reagent disc carrying a first dry buffer is located in the first reaction site of the first branch, a second reagent disc carrying a second dry buffer different from the first dry buffer is located in the first reaction site of the second branch, a third reaction disc carrying a first colorimetric reaction agent is located in the second reaction site of the first branch and a fourth reaction disc carrying a second colorimetric reaction agent is located in the second reaction site of the second branch.

In an aspect, invention comprises a microfluidic device comprising a stack of at least two solid layers forming a microfluidic channel arrangement there between and at least one opening into the microfluidic channel arrangement wherein the microfluidic device comprises at least one reagent disc at least partly located in the microfluidic channel arrangement, wherein the reagent disc comprises a support disc carrying at least one dry reagent.

The microfluidic device may advantageously be is obtainable by the method described herein.

For example, the reagent disc may comprise a membrane impregnated with an ionophore cocktail, comprising an ionophore for a target ion, such as described above.

In an embodiment, the microfluidic channel arrangement comprises two or more reagent discs wherein at least one of the reagent discs is located downstream to at least one other of the reagent discs at least one reaction chamber.

As describe above the microfluidic channel arrangement may comprises two or more reagent discs located in a common reaction chamber of the microfluidic channel arrangement. The two or more reagent discs may be located on top of each other and/or laterally to each other.

In an aspect, the invention comprises a system for performing inorganic determinations, such as nutrient tests of soil samples, wherein the system comprises

- a plurality of soil sample bags, each comprising a unique barcode;
- a plurality of microfluidic devices and
- a reader adapted to generate a test result from the respective microfluidic devices and
- an associated barcode scanner arrangement.

The reader and the associated barcode scanner arrangement comprise one or more computer elements forming part of a computer system in data communication. At least the associated barcode scanner arrangement comprises a global positioning system (GPS). The associated barcode scanner arrangement may comprise one or more associated barcode scanners each preferably comprising a GPS.

The associated barcode scanner arrangement comprises a first mode, wherein when reading each of the respective unique barcodes at respective specific locations, the respective unique barcodes are associated to the respective specific locations determined by the GPS and data representing the respective unique barcodes associated to the respective specific locations are stored in the computer system.

The associated barcode scanner arrangement comprising a second mode, wherein when reading the respective unique barcodes, the respective unique barcodes are associated to at least one, preferably two or more test results, each representing an inorganic determination, where the test result(s) is/are obtained by the reader from the respective microfluidic devices, and data representing the respective unique barcodes associated to the respective test results is stored in the computer system.

The test result representing an inorganic determination may be the inorganic determination, an optical parameter representing the inorganic determination or any other parameter from which the inorganic determination may be derived.

The inorganic determination or determinations may be any of the above-described determinations.

The computer system is configured for correlating the data representing the respective unique barcodes associated to the respective specific locations with the data representing the respective unique barcodes associated to the respective test results and to generate data representing the respective test result(s) to the respective specific locations.

The system makes it simple to ensure that the position of taking a sample and the teste result of this sample are not mixed up with other samples or positions. Many samples may be withdrawn and the sample bags may be scanned, thereby logging the position of taking the sample. At a later stage when the result of the test is found the result is associated to the barcode and the computer system can associate the test result to the location of taking the sample. Thus, hundreds of samples may be withdrawn from different locations, without risking mixing the samples or the test results.

The associated barcode scanner arrangement advantageously comprises one or more associated movable localization barcode scanner. The associated movable localization barcode scanner(s) preferably comprises a GBS and is/are preferably configured for operating in the first mode.

In an embodiment, the associated barcode scanner arrangement comprises a plurality of associated movable localization barcode scanners. Thereby several persons may simultaneously withdraw soil samples, scan the respective sample bag al the respective location of withdrawing the soil samples. All the samples may be transported to a test location for being tested for one or more inorganic determination e.g. inorganic determinations ad described above.

Advantageously the associated barcode scanner arrangement comprises at least one associated reader located barcode scanner. The associated reader located barcode scanner is advantageously configured for operating in the second mode. The reader located barcode scanner need not have a GPS.

The associated reader located barcode scanner may be located adjacent the reader e.g. by being physically connected to the reader and/or by being connected to the reader by short range data connection, such as Bluetooth.

In an embodiment, the associated movable localization barcode scanner operating in first mode and the and the associated reader located barcode scanner operating in second mode may be integrated in a combined scanner capable of operating in both first mode and second mode.

Each of the plurality of microfluidic devices advantageously comprises a barcode identical to or correlated to the respective unique barcode of the respective sample bags.

When taking a soil sample to be tested from a soil sample bag, the user may scan the unique barcode of the sample bag and the unique barcode of the microfluidic device using the associated reader located barcode scanner operating in the second mode. Thereby the unique sample bag bar code is associated to the microfluidic device and to the test result(s) obtained using this microfluidic device. When repeating with the plurality of soil sample in soil sample bags with respective unique barcodes, these respective unique sample bag barcodes are associated to respective microfluidic device bar codes and thereby to the respective test results obtained by said respective microfluidic devices.

Thereby any risk of mixing up the microfluidic devices may be avoided. The system may then be used by people with only few instructions.

In an embodiment, the plurality of soil sample bags, each comprises an additional removable barcode correlated to or identical to the unique barcode. The respective microfluidic devices may for example comprise a location for mounting the respective additional removable barcodes, so that when taking a soil sample to be tested from a soil sample bag, the user may apply the additional removable barcode to the microfluidic device for performing the teat(s) on the sample, and at the same time scan the scan the additional removable barcode using the associated reader located barcode scanner operating in the second mode.

The plurality of microfluidic devices may be equal or different from each other. Advantageously one or more, such as all of the plurality of microfluidic devices are as described above.

The associated barcode scanner arrangement may comprise a tablet, such as a mobile phone. The scanner(s) of the associated barcode scanner arrangement may advantageously be in the form of one or more apps.

The computer system may comprise one or more computers in data communication e.g. via wireless connection(s). One or more of the computers may form part of the reader, a tablet and/or the associated barcode scanner arrangement.

Advantageously, the computer system comprises one or more displays, such as a screen and/or a printer. The computer system is advantageously configured for generating date representing a set of latitude and longitude coordinates correlated to the respective test results and preferably for transmitting the set of data to be displaced on a screen, for example in list form and/or on a map.

All features of the inventions including ranges and preferred ranges can be combined in various ways within the scope of the invention, unless there are specific reasons not to combine such features.

DESCRIPTION

Brief Description of the Examples and Drawing

The invention is being illustrated further below in connection with selected examples and embodiments and with reference to the figures. The figures are schematic and may not be drawn to scale.

FIG. 1 illustrates an embodiment of a microfluidic device carrying a number of reagent discs and suitable for use in an embodiment of the method of performing inorganic determinations of the invention.

FIGS. 2_a_ and 2_b_ illustrate two different shapes of reagent discs.

FIG. 2_c_ illustrates rows of reagent discs under production.

Figure 1:
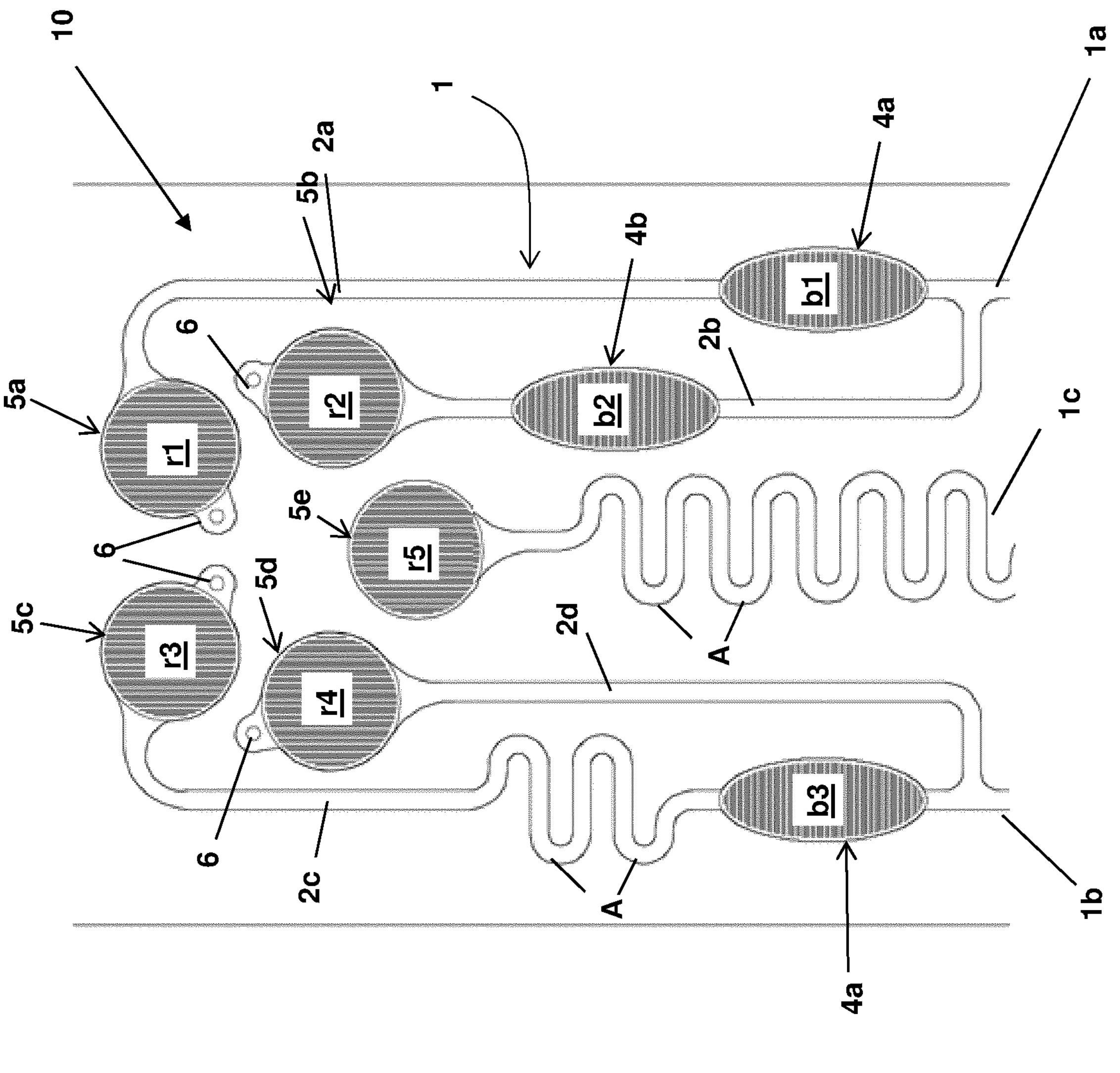

The microfluidic device 10 shown in FIG. 1 comprises a furcated channel arrangement 1 comprising a number of fluid interconnected channels, comprising primary channels 1_a_, 1_b_, 1_c_. The three primary channels are in fluid connection with a common, not shown inlet for feeding a sample to the microfluidic device. A first 1_a_ of the primary channel comprises a first branch 2_a_ and a second branch 2_b_, A second 1_b_ of the primary channel comprises a third branch 2_c_ and a fourth branch 2_d_. Each of the first, second and third branches comprises a first reaction site 4_a_, 4_b_, 4_c_ and a second reaction site 5_a_, 5_b_, 5_c_ in flow direction further from the inlet than the first reaction site. Each of the first reaction sites 4_a_, 4_b_, 4_c_ comprises a reagent disc b1, b2, b3. As explained above the reagent discs b1, b2, b3 in at least two and preferably more first reaction sites may comprise a dry buffer. For example, reagent disc b1, may comprise a buffer having a first pH value upon aqueous dissolution, reagent disc b2, may comprise a second dry buffer having a second pH value upon aqueous dissolution and reagent disc b3, may comprise a third dry buffer having a third pH value upon aqueous dissolution.

Each of the second reaction site 5_a_, 5_b_, 5_c_ comprises a respective reaction disc r1 r2, r3 comprising colorimetric reaction agents Since the sample portions arriving at the second reaction sites 5_a_, 5_b_, 5_c_ may adjusted to a preselected pH value the colorimetric reaction agents of the reaction discs r1, r2, r3 may be pH sensitive reagents, e.g. with reaction optimum at different pH value. As explained above, this makes it possible for a user to make several pH sensitive inorganic determinations at the same time in a very simple manner.

In this embodiment, the fourth branch 2_d_ comprises only one single reaction site 5_d_ comprising a reaction disc r4, which may preferably comprise colorimetric reaction agents, which do preferably not require a specific pH value.

The third primary channel 1_c_ comprises a single reaction/read out site 5_e_, which may or may not comprise a reaction disc. Here it is illustrated to comprise a reaction disc r5.

This third primary channel 1_c_ and the reaction/read out site 5_e_ may be arranged for performing a further inorganic determination. The third primary channel 1_c_ and the reaction/read out site 5_e_ may advantageously be arranged for determine when all the reactions in the other reaction sites are terminated.

Thereby it may be simpler for the user to determine when the reactions are finished and the microfluidic device 10 is ready for reading out. For example, where a determination unexpected gives a lower result, the user may think that the reaction is not final and then the user may waste time.

To ensure that fractions of the sample reaches the reaction site 51 of the third primary channel 1*c* at a desired time later than fractions of the sample reaches the other secondary reaction sites 5*a*, 5*b*, 5*c*, 5*s*, the third primary channel 1*c* may be shaped to delay the liquid flow, e.g. by folding the channel e.g. with accordion folds A as illustrated. Any other delay arrangements of the third primary channel 1*c* may be provided.

The channels of the channel arrangement may be folded as desired and for example also the branches 2*a*, 2*b*, 2*c*, 2*d* may be folded to regulate the velocity of the sample in the respective channel branches. The branches 2*a*, 2*b*, 2*c*, 2*d* further comprises escape openings for allowing gas escaping from the respective branches 2*a*, 2*b*, 2*c*, 2*d* as the sample flow is progressing therein. The escape opening is located downstream to the reaction chambers 5*a*, 5*b*, 5*c*, 5*d*. The third primary channel 1*c* may likewise comprise a downstream located escape opening.

The dry buffers, the reaction agents and/or the reaction discs may advantageously be as described elsewhere herein.

The skilled person will understand that the channel arrangement 1 may be constructed to make as many determinations simultaneously as practically desired and the determinations may involve pH sensitive reagents at various pH value as well as non pH sensitive reagents.

Figure 2B:
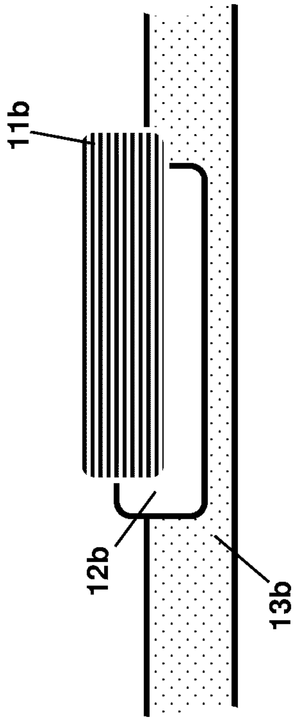
Figure 2A:
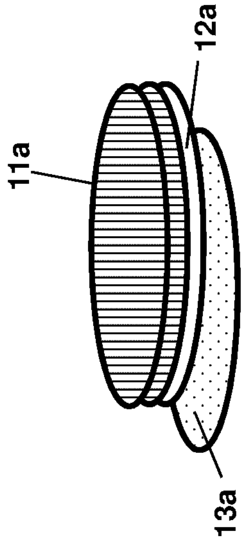

FIG. 2*a* shows a round reagent disc prior to being applied to a reaction chamber of a microfluidic device. The reaction disc comprises a support disc 12*a* e.g. as described elsewhere herein. The support disc 12*a* carries the dry reagents 11*a*. Here it is illustrated that the reagents is evenly spread over the entire layer of the support disc 12*a*. In a variation there of the reagents are distributed differently, for example dropwise, in lines or any conveniently way.

The reagents may adhere to the support disc by being applied on moist form and thereafter dried. In an embodiment, the reagents are adhered to the support disc, e.g. by an adhesive located at the top surface of the support disc.

The support disc may advantageously carry a pressure sensitive adhesive on its bag side—i.e. the side opposite to the front side carrying the reagents. In order to handle the support disc with adhesive on its rear side the support disc preferably comprises a release paper, which may be removed prior to applying the reagent disc to the reaction chamber of a microfluidic device. The pressure sensitive adhesive on the rear side of the reagent disc makes it very simple to positioning the reagent disc in the desired location. For example the reagent disc may be positioned at any desired location in a reagent chamber and the method also make it possible to positioning two or more equal or different reagents discs in a common reagent chamber in a desired configuration.

FIG. 2*b* shows a reagent disc with another shape. Here it is rectangular with rounded corners. It should be appreciated that the reagent disc may have any shape.

The reaction disc comprises a support disc 12*b* e.g. as described elsewhere herein. The support disc 12*b* carries the dry reagents 11*b*. Here it is illustrated that the reagents is applied in lines of reagents. Each line may be different or equal.

The support disc may advantageously carry a pressure sensitive adhesive on its rear side. In order to handle the support disc during production the support disc preferably comprises a release paper 13*b*. Advantageously a plurality of reagent discs shares release paper 13*b* and it withdrawn from the release paper immediately before being applied to a reaction chamber. As illustrated the release paper 13*b* is a long strip, which may carry several reagent discs.

Figure 2C:
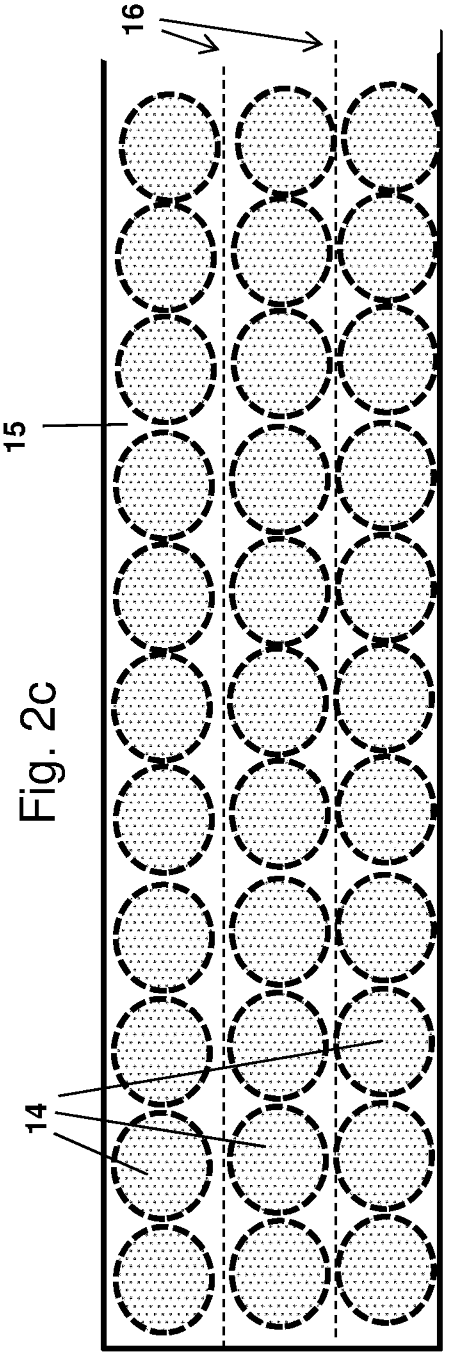

FIG. 2*c*, illustrated a series of reagent discs during production. The support structure 15 preferably carries a pressure sensitive adhesive on its rear side and the pressure sensitive adhesive is covered with a release paper.

The reagents is applied to the support structure e.g. is predetermined locations or spread over the entire surface and the reagents are dried e.g. by allowing it to dry by air or using a blower or other means. The reagent discs 14 are cut without cutting through the release paper. Here the reagent discs are round, but they could have any shape as mentioned above. Thereafter the support structure including the release paper is cut along lengthwise cutting lines 16 to obtain three strips of release paper carrying rows of reagent discs.

The reagent discs may thereafter individually be removed from the release paper and mounted in a reaction chamber of a microfluidic device.

Figure 3:
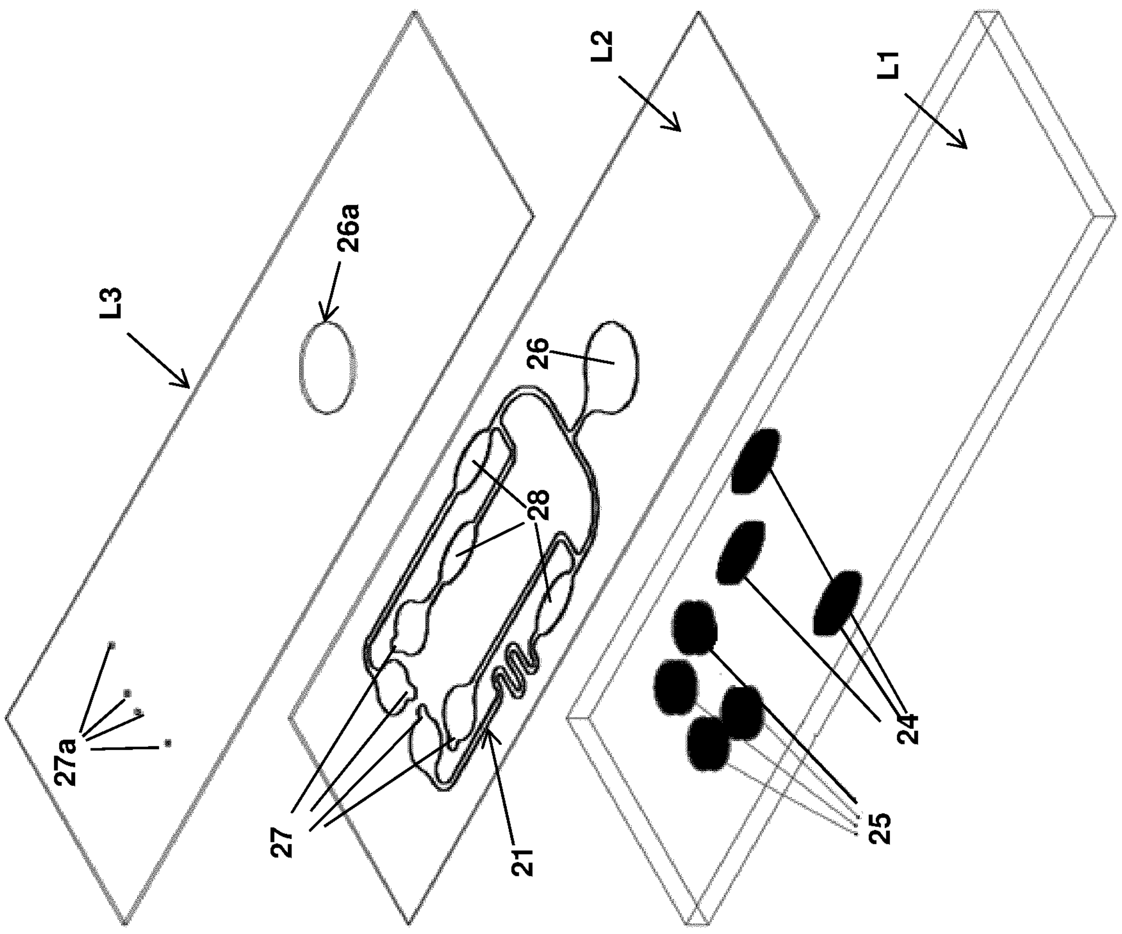
FIG. 3 is an exploded view of an embodiment of a microfluidic device.

FIG. 3 illustrates a variation of the microfluidic device of FIG. 1 in exploded view. The microfluidic device is it produced by a method comprising applying three solid layers L1, L2, L3 together.

The bottom layer L1, may be a layer or layers of polymer or paper or a combination thereof, such as a layered product and the bottom pater may simply be cut out. In an alternative version, the bottom layer is produced by injection molding.

The middle layer L2 may advantageously be produced by cutting e.g. as described above, e.g. by laser cutting or a stamping the layer or layers of polymer or paper or a combination thereof. The cutting of the middle layer L2, comprises cutting through the layer L2 to form the channel arrangement 21. The middle layer will then have a through hole shaped as the channel arrangement comprising an inlet 26, channel branches with reaction chambers for buffer reaction 28, reaction chambers for colorimetric reaction and a downstream location 27 for escape openings. The middle layer should advantageously have a selected thickness, to provide the depth of the channels of the channel arrangement.

The top layer L3 make likewise be cut, where the cutting comprises providing a through hole 26*a* for the inlet 26 and escape openings 27*a* into the downstream location 27.

The reagent discs 24, 25 may be positioned onto the bottom layer L1 before or after assembling the bottom layer L1 with the middle layer L2, but prior to applying the top layer L3. The reagent discs 24, 25 are advantageously adhered to the bottom layer using the pressure sensitive adhesive located at the rear side of the reagent discs 24, 25. In an alternative embodiment the front surface of the bottom layer L1 facing the middle layer L2 carries a pressure sensitive adhesive.

The three layers L1, L2, L3 are advantageously mounted to each other using pressure sensitive adhesive.

The branches 2*a*, 2*b*, 2*c*, 2*d* further comprises escape openings for allowing gas escaping from the respective branches 2*a*, 2*b*, 2*c*, 2*d* as the sample flow is progressing therein. The escape opening is located downstream to the reaction chambers 5*a*, 5*b*, 5*c*, 5*d*. The third primary channel 1*c* may likewise comprise a downstream located escape opening.

Figure 4:
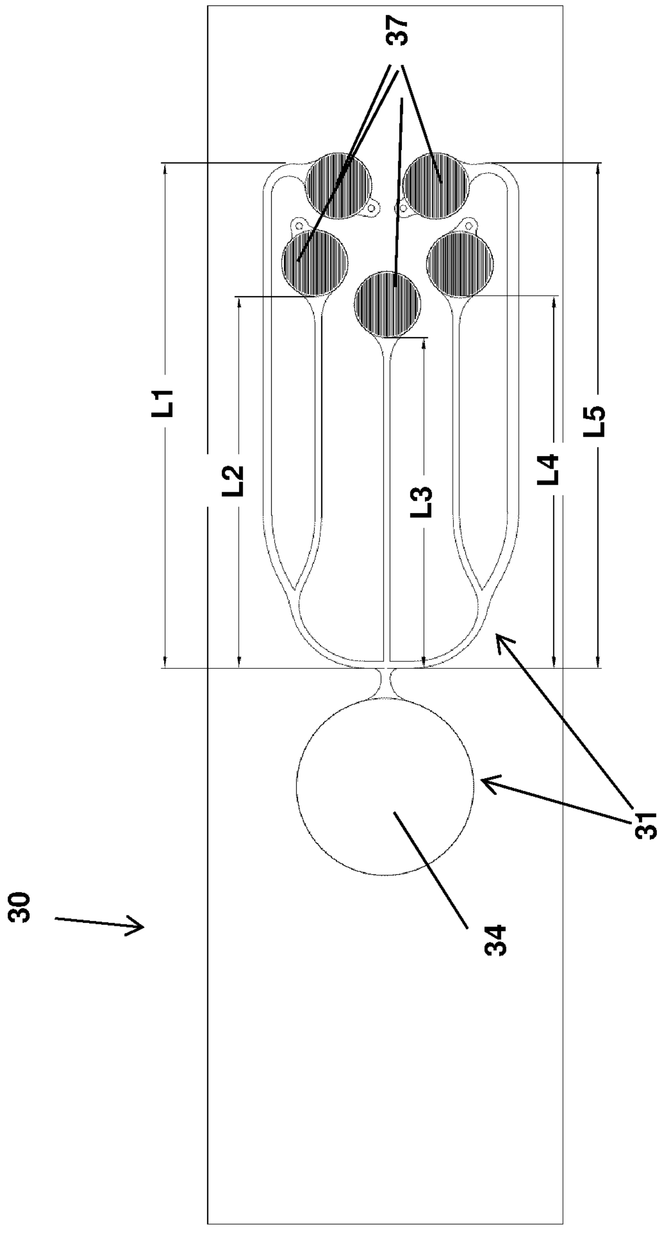
FIG. 4 is a top view of an embodiment of a microfluidic device

FIG. 4 show an embodiment of a microfluidic device 30, comprises a channel arrangement 31 with an inlet 34 and a number of branches in fluidic connection with the inlet 34 and with respective reaction chambers 37 with reaction discs comprising respective colorimetric reaction agents. As shown the branch lengths L1, L2, L3, L4, L5 from the inlet to the respective reaction chambers 37 differs, such that L1 and L5 are longer than L2 and L4, which again are longer than L3.

It should be appreciated that the branches may be designed with any desired branch length, e.g. by providing a branch with folds.

Figure 5:
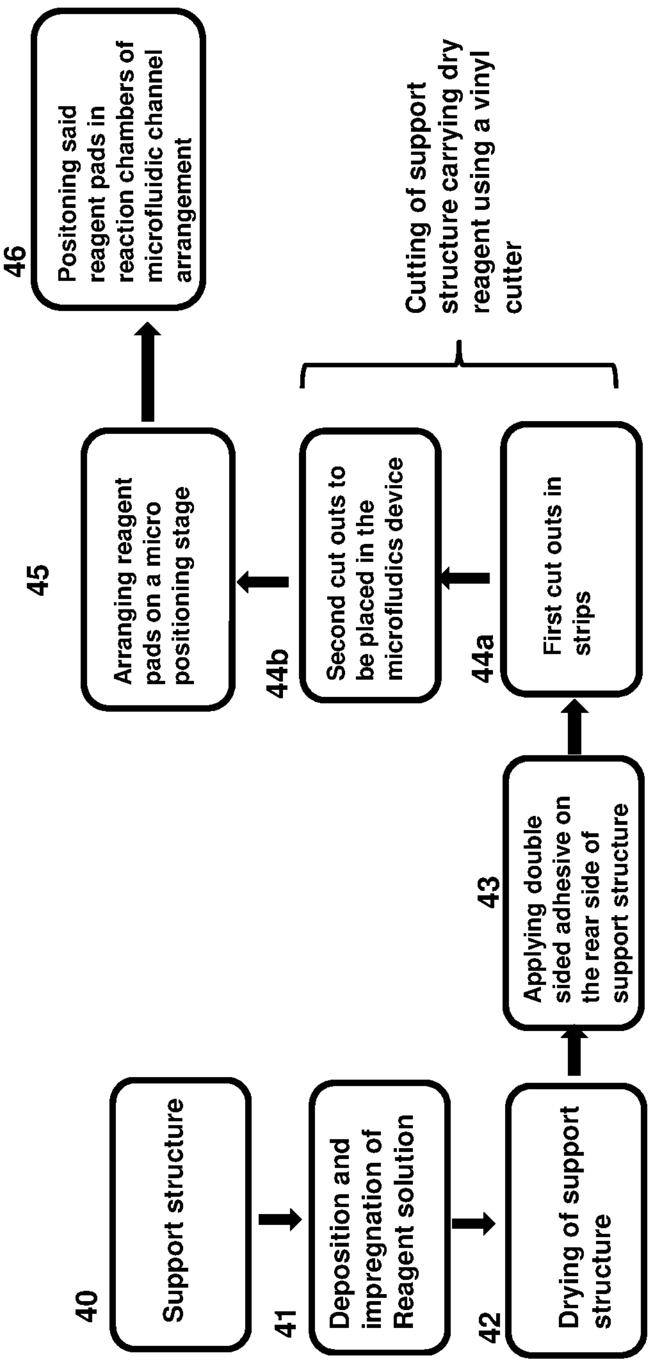
FIG. 5 is an example of a process diagram of an embodiment of the method of producing a microfluidic device of the invention.

FIG. 5 is an example of a process diagram of an embodiment of the method of producing a microfluidic device of the invention and specifically the step of producing and locating the reaction discs in desired reaction chamber of microfluidic channel arrangements of microfluidic devices.

First in step 40 a desired substrate is provided e.g. as described above. The selected reagents are in steps 41 and 42 applied to the front side of the substrate and dried. The reagents may be applied applied to the substrate in form of one or more mixtures of reagents or one reagent at a time with or without intermediate step(s) of drying. In this example, a double sided adhesive with a peel-off slip-layer on one of its side is adhered to the rear side of the substrate in step 43. Thereafter the substrate with the adhesive is cut. In a first cut in step 44*a*, the substrate with the adhesive is cut in a first direction e.g. in lines, without cutting through the peel-off slip-layer. Thereafter in step 44*b* the substrate with the adhesive is cut in a second direction e.g. in lines crossing the first direction lines—The second cut may optionally be fully through the substrate with the adhesive and peel-off slip-layer. Alternatively the peel-off slip-layer is not fully cut.

Thereafter in step 45 the Cut substrate—still supported by the peel-off slip-layer is arranged on a computer controlled micropositioning stage, capable of generating mechanical motion with micrometer or nanometer resolution. In step 46 the individual reagent discs are released from the peel-off slip-layer and positioned in a reaction chamber or on a solid layer adapted to form part of a reaction chamber of a microfluidic device by the micropositioning stage. The micropositioning stage is capable of locating the reagent discs with a very high accuracy and very fast.

Figure 6:
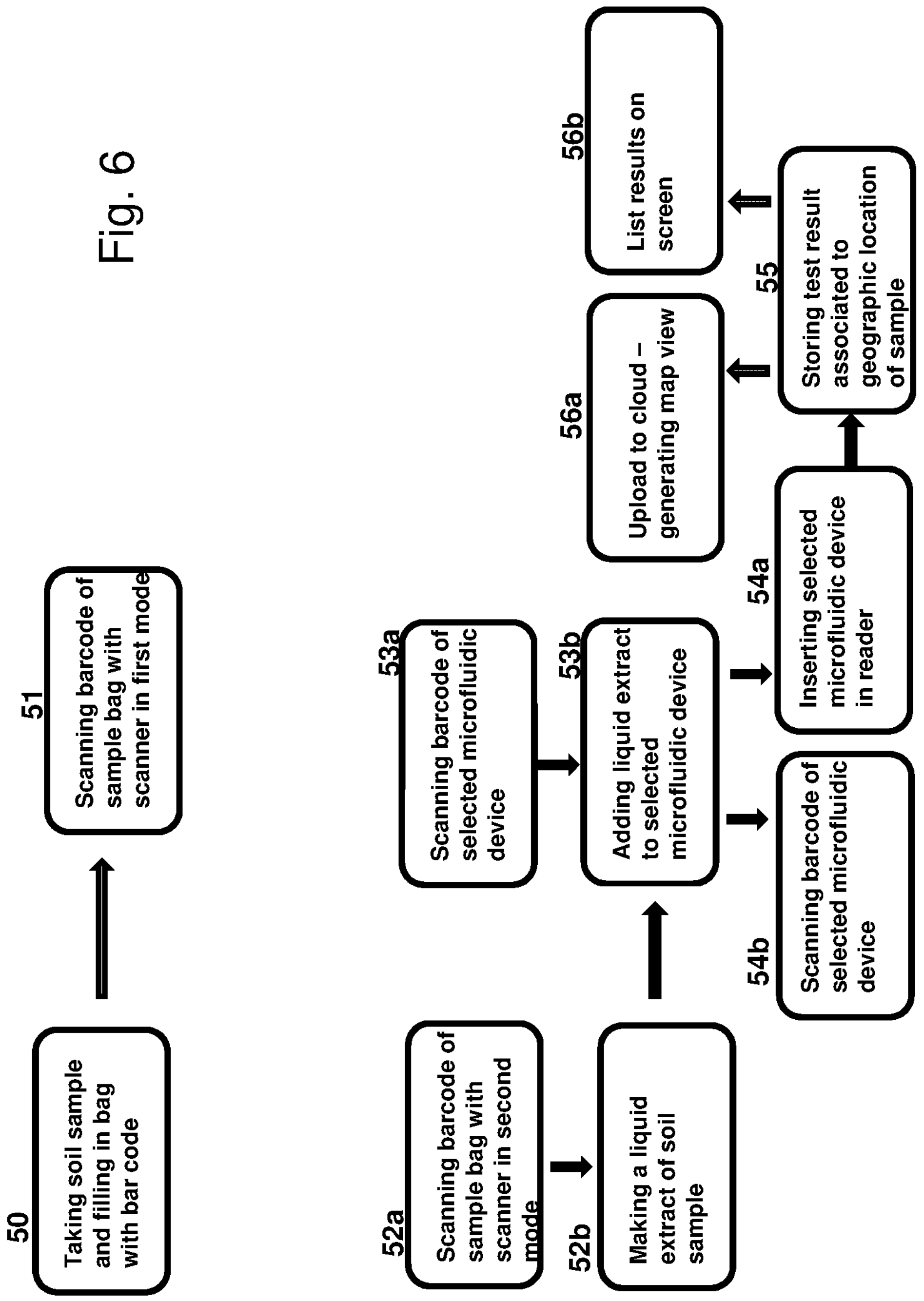
FIG. 6 is an example of a process diagram of an embodiment of performing inorganic determinations using an embodiment of the system of the invention.

FIG. 6 illustrates an example of a process diagram of an embodiment of performing inorganic determinations using an embodiment of the system of the invention.

The process diagram in FIG. 6 illustrates a process of operation of the system of an embodiment of the invention.

First step 50 is to withdraw a sample of soil and filling it into a sample bag. In step 51, at the location of withdrawing the sample, the barcode of the sample bag is scanned with a scanner in a first mode. The scanner form part of a scanner arrangement as described above.

At the same location or at any other location e.g. a central testing location in step 52*a* and 52*b*, which may be in any order, a fraction of the sample is withdrawn from the sample bag and an extract is prepared. Further, the barcode of the sample bag is scanned with a barcode scanner of the scanner arrangement in second mode. Now the geographical location of taking the sample of the sample bag is associated to the selected microfluidic device.

In step 53*a* a microfluidic device is selected and scanned with a scanner of the system. In step 53*b* the liquid extract is added to the selected microfluidic device. The skilled person will understand that the order of scanning the microfluidic device and adding the sample may be any order.

After a prescribed testing time, which may be for example ½ minute or 5 minutes, the selected microfluidic device is in step 54*a* inserted into a reader which is associated with the scanner arrangement. At the same time—before or after—the bar code of the microfluidic device is scanned. Thereby the result obtained from the selected microfluidic device will be associated to the geographical location of taking the sample that is under test.

In an alternative embodiment the microfluidic device is not scanned and need not carrying a barcode and instead the step of scanning the sample bag with the scanner in second mode may be performed in step 54*b* instead of in step 52*a*.

The result obtained from the reader is stored in step 55 such that the test result is associated to the geographical location of taking the sample. The test result is uploaded to cloud for generating a map in step 56*a* and in step 56*b* the result is listed on a screen together of results of samples from other geographical locations.

Example 1—Soil Sample

1. A pre weighed sample (1-5 g) of soil is extracted in a syringe using a soil extraction solution for 15 minutes.

2. After extraction two drops of the sample are fed into the inlet of a microfluidic device as shown in FIG. 1, but without the third primary channel 1*c* and wherein reaction channel 2*d* comprises a first reaction 4*d* chamber downstream to the reaction chamber 5*d*, which is then referred to as second reaction chamber 5*d*.

The four branches 2*a*, 2*b*, 2*c*, 2*d* are adapted for performing four different determinations.

Nitrate:

The nitrate assay branch 2*b* has a reaction disc carrying a reducing agent, zinc loaded in first reaction site 4*b* and a reaction disc carrying a griess reagent in second reaction site 5*b*.

Potassium:

The potassium assay branch 2*a* has a reaction disc carrying 0.002 M citric acid buffer of pH 6.5 loaded in first reaction site 4*a* and a reaction disc carrying an ionophore cocktails in second reaction site 5*a*.

The ionophore cocktails recipe is a follows:

0.52% Nile blue 1% Potassium ionophore-BME 44 0.48% Potassium tetrakis(4-chlorophenyl) borate 66% Bis (2-ethylhexyl)sebacate 32% Poly(vinyl chloride)

Ammonium:

The ammonium assay branch 2*c* has a reaction disc carrying TrisHCl buffer of pH 7 loaded in first reaction site 4*c* and a reaction disc carrying an ionophore cocktails in second reaction site 5*c*.

The ionophore cocktails recipe is a follows:

2.00 wt % Ammonium ionophore 11.2 wt % Potassium tetrakis(4-chlorophenyl)borate 2.100 wt % Chromoionophore III 65.50 wt % Bis(2-ethylhexyl)sebacate (84818) 15.00 wt % Poly(vinyl chloride) high molecular weight 15.00 wt % Polyurethane Phosphate:

The phosphate assay branch 2*d* has a reaction disc carrying H2SO4, 5N pH 1 buffer in first reaction site 4*d* and a reaction disc carrying the following reagents in second reaction site 5*d*:

antimony potassium tartrate, 4 mM ammonium molybdate, 0.27M 0.1 M ascorbic acid solution.

The liquid is allowed to through the channels and reached the reaction chambers which provide signals.

The microfluidic device is then inserted in the analysis device comprises the reader and computer system and the algorithms on the device predict the quantitative value of the inorganic molecule of interest.

Example 2—Urine Sample

A urine sample is provided and optionally diluted.

A two drops of the sample are fed into the inlet of a microfluidic device. The microfluidic device is identical to the microfluidic device used in example 1.

After the sample has reached and reacted with the reagents, the microfluidic device is then inserted in the analysis device comprises the reader and computer system and the algorithms on the device predict the quantitative value of the inorganic molecule of interest.

Example 3—Plant Sap

Sap is extracted from the plant for example from the leaf or stem petiole.

Two drops of sap are fed into the inlet of a microfluidic device and the analysis is performed as in example 2.

Example 4—Production of Reagent Discs

For each type of reagent disc a reagent solution is produced for example 1 litre reagent solution An example of producing reagent discs and a microfluidic device with reagent discs. A support structure is provided e.g. in form of long length of pater or sheets of A4 or A5 size etc.

The support structure advantageously is selected in dependence of the reagent. The pore size and matrix composition of the support structure may affect the embedding of the reagents.

The support structure is dipped into the solution for 60 seconds and where after the support structure is air-dried in a low humidity area, e.g. by hanging vertically using hooks. The time required for drying differs in dependence on the reagent solution and the support structure used.

After drying the support structure with the dried reagents is cut into Strips using a vinyl cutter and pre-cuts into specific sized circular discs of 2-3 mm diameter is performed, such that the circular discs remain connected to the strip, but can be removed by a mechanical picking process. The reagent discs are now ready to be used in the microfluidic device.

In a variation thereof, the support structure with dry reagents is cut into sheets of size A5 or 128×80 cm or 100×100 cm.

In a variation thereof, a die-cutter with a selected height according to the thickness of the support structure is applied for cutting the support structure with dry reagents.

Example 5—Production of a Microfluidic Device

Three layers of material L1, L2 and L3 as shown in FIG. 3 are provided. The Bottom layer L1 carries a pressure sensitive adhesive on its middle layer facing side and the top layer L3 carries a pressure sensitive adhesive on its middle layer facing side.

The strips comprising the circular reagent discs produced in example 4 are then fed into an automatic pick and place machine. The circular reagent discs are picked and placed at predetermined locations onto and adhered to the bottom layer L1 using an automated robot arm. Subsequently, the middle layer L2 and the top layer L1, which have an adhesive on one side, are assembled.

Example 6—Production of a Microfluidic Device

In a 100 hectare field, 40-50 spots are selected and a soil sample is collected from each spot. At the collection spot the soil sample is placed in a sample bag, which carries a unique bar code and the bar code is scanned using a barcode scanner of a barcode scanner arrangement comprising a global positioning system (GPS) and associated to a reader, wherein the barcode scanner is operating in a first mode, such that geographic coordinates of the location of taking the soil sample are associated with the unique barcode and the bag with the soil sample.

The soil sample bags are brought to a test location, where each of the respective soil samples are tested by performing a plurality of inorganic determinations using the method and microfluidic devices as described above and comprising for each sample.

- withdrawing a portion of the preselected matter,
- subjecting the portion of environmental matter to an extracting process comprising mixing the sample with a predetermined amount of an aqueous extracting solvent, and
- filtering off solid parts,
- adding the sample to a microfluidic device
- applying the microfluidic device in the reader, which is associated to the barcode scanner arrangement
- scamming the barcode of the sample bag wherefrom the sample under analysis was withdrawn using a barcode scanner of the barcode scanner arrangement, where the scanner is operating in a first mode.

Thereby the geographic coordinates of the location of taking the soil sample are associated with the test result obtained from the microfluidic device with the liquid sample, which is extract from soil taking at the geographic coordinates of the location of taking the soil sample.

The data gathered is using mathematic models and statistics to determine the inorganic concentration of the ions from the reader. The data gathered in terms of test results gathered from microfluidic devices is stored on a computer system and displayed either directly on the screen of the reader or on a IoT platform (Internet of Thinks platform) in the form of a map or list.

Example 6—Production of a Microfluidic Device

Two solid polymer layers is provided, including a channel forming layer and a cover layer. The channel-forming layer is milled to form a carved channel arrangement with the desired depths and widths of reaction chambers and the flow channels. One or more selected reagent discs are prepared and positioned at the bottom of one or more of the carved reaction chambers. The cover layer carries a pressure sensitive adhesive and is stacked with the channel-forming layer to form the microfluidic channel arrangement.

In a first variation thereof, the channel arrangement is formed in the channel-forming layer by laser ablation.

In a second variation thereof, the channel arrangement is formed in the channel-forming layer molding of the layer.

In a third variation thereof, the channel-forming layer with the channel arrangement is formed by stacking at least two layers a first basic layer and a second middle layer with through-cuts forming the channel arrangement. The basic layer and/or the middle layer may comprise a pressure sensitive adhesive for fixing to each other.

In an embodiment, the middle layer carries an adhesive on both of its sides for adhering both to the first basic layer and to the cover layer.

It has been observed that, in this third variation comprising three solid layers, a basic layer, a middle layer and a cover layer only one of the layers need to be hydrophilic to provide a desired uniform and fast flow of a hydrophilic liquid sample, without addition of surfactant to the liquid sample.

In a fourth variation thereof, two selected reagent discs are prepared and positioned at the bottom of a common reaction chamber.

In a fifth variation thereof, two selected reagent discs are prepared and positioned at the bottom of separate reaction chambers, such as separate reaction chambers of separate branches of the microfluidic channel arrangement or separate reaction chambers where one of the reaction chambers is located downstream to the other one of the reaction chambers.

In a sixth variation thereof, one or more of the layers has a hydrophilic surface forming a surface area of the microfluidic channel arrangement. For example the cover layer may be of a hydrophilic PMMA or a polyester coated with a surfactant e.g. as the materials described above.

What is claimed is:

1. A microfluidic device comprising a stack of at least two solid layers forming a microfluidic channel arrangement there between and at least one inlet into the microfluidic channel arrangement wherein the microfluidic device comprises at least one first reagent disc at least partly located in said microfluidic channel arrangement, wherein said at least one first reagent disc comprises a colorimetric reaction agent, wherein the colorimetric reaction agent comprises at least one of diphenylthiocarbazone, 2,2'-Bipyridy, molybdate and/or leucomalachite green dye.

2. The microfluidic device of claim 1, wherein said at least one first reagent disc comprises a support disc carrying a least one dry reagent comprising said colorimetric reaction agent.

3. The microfluidic device of claim 2, wherein the support disc has a thickness of 96 mm or less.

4. The microfluidic device of claim 1, wherein said at least one first reagent disc is adhered to at least one of said at least two solid layers forming the microfluidic channel arrangement there between.

5. The microfluidic device of claim 1, wherein the microfluidic device comprises at least one second reagent disc impregnated with at least one of a reducing agent or a dry buffer at least partly located in said microfluidic channel arrangement, wherein the dry buffer upon aqueous dissolution form a buffer, wherein said microfluidic channel arrangement is provided to have at least one reaction site in the form of a reaction chamber, wherein said at least one first reagent disc comprises said colorimetric reaction agent and said at least one second reagent disc impregnated with dry buffer are located on top of each other or laterally to each other in said reaction chamber.

6. The microfluidic device of claim 1, wherein the microfluidic device comprises at least one second reagent disc impregnated with dry buffer at least partly located in said microfluidic channel arrangement, wherein the dry buffer upon aqueous dissolution form a buffer, wherein said microfluidic channel arrangement is provided to have at least one reaction site in the form of a reaction chamber, wherein said at least one first reagent disc comprises said colorimetric reaction agent is located downstream to said at least one second reagent disc impregnated with dry buffer.

7. The microfluidic device of claim 1, wherein the microfluidic channel arrangement comprises a furcated channel arrangement comprising an inlet and at least a first branch and a second branch, each branch comprises a first reaction site and a second reaction site in flow direction further from the inlet than the first reaction site, wherein the first reaction site of the first branch comprises a first dry buffer having a first pH value upon aqueous dissolution and the first reaction site of the second branch comprises a second dry buffer having a second pH value upon aqueous dissolution and wherein each of the second reaction sites comprises respective colorimetric reaction agents, wherein at least one of said colorimetric reaction sites is in the form of said at least one first reagent disc comprising said colorimetric reaction agent.

8. The microfluidic device of claim 7, wherein at least one other of said colorimetric reaction sites is in the form of said at least one reagent disc comprising an ionophore.

9. The microfluidic device of claim 1, wherein the microfluidic channel arrangement comprises at least one branch comprising a first reaction site and a second reaction site, wherein a further reagent disc carrying a reducing agent is located in the first reaction site and a reagent disc of the at least one first reagent disc carrying a Griess reagent is located in the second reaction site.

10. The microfluidic device of claim 1, wherein microfluidic channel arrangement comprises at least one branch comprising a first reaction site and a second reaction site, wherein a further reagent disc carrying sulfuric acid is located in the first reaction site and a reagent disc of the at least one first reagent disc carrying antimony potassium tartrate, ammonium molybdate and ascorbic acid is located in the second reaction site.

11. A method of producing a microfluidic device, the method comprising providing at least two solid layers stacking said at least two solid layers to form a microfluidic channel arrangement comprising at least one opening into a channel of the microfluidic channel arrangement, wherein the method further comprises producing at least one reagent disc and arranging said at least one reagent disc between said at least two solid layers to provide that at least a portion of the of the at least one reagent disc is located in said microfluidic channel arrangement downstream to said at least one opening into the channel, wherein said at least one reagent disc comprises at least one first reagent disc comprises a support disc carrying at least one dry colorimetric reaction agent, wherein the colorimetric reaction agent comprises at least one of diphenylthiocarbazone, 2,2'-Bipyridy, molybdate and/or leucomalachite green dye.

12. The method of claim 11, wherein the method of producing said at least one reagent disc(s) comprises providing a support structure, adding a solution comprising at least one reagent, drying said solution and cutting said at least one reagent disc(s) from said support structure carrying said dried reagent.

13. The method of claim 12, wherein the method comprises adding two or more layers comprising reagent(s), wherein one layer comprising reagent(s) comprises a buffer and another layer comprising reagent(s) comprises a reactant for a target unit, wherein the target unit comprises a target organic or inorganic molecule or ion.

14. The method of claim 11, wherein said microfluidic channel arrangement is provided to have at least one reaction site, wherein the method comprises arranging said at least one reagent disc to be located at said at least one reaction site.

15. The method of claim 11, wherein said at least one reagent disc has an adhesive at its rear side or wherein one of said solid layers comprises an adhesive and wherein the at least one reagent disc is adhered to said solid layer to provide that at least a portion of the at least one reagent disc is located in a reaction chamber of said microfluidic channel arrangement.

16. The method of claim 11, wherein said microfluidic channel arrangement is provided to comprise at least one microfluidic furcated channel branching at least a first branch and a second branch, wherein each of said first branch and second branch comprises a first reaction site and a second reaction site in flow direction further from the inlet than the first reaction site, wherein the method comprises providing said first reaction site to comprise a first dry buffer having a first pH value upon aqueous dissolution and providing said first reaction site of the second branch to comprise a second dry buffer having a second pH value upon aqueous dissolution and wherein each of the second reaction sites comprises respective colorimetric reaction agents, wherein at least one of said colorimetric reaction agents or dry buffer is in the form of the at least one reagent disc.

17. A system for performing a plurality of inorganic determinations, wherein the system comprises a plurality of soil sample bags, each comprising a unique barcode;

a plurality of microfluidic devices of claim 1;

a reader adapted to generate a test result from said respective microfluidic devices and an associated barcode scanner arrangement wherein said reader and said associated barcode scanner arrangement comprising computer elements forming part of a computer system in data communication, wherein said associated barcode scanner arrangement comprising a global positioning system (GPS) and comprising a first mode, wherein when reading each of said respective unique barcodes at respective specific locations, said respective unique barcodes are associated to said respective specific locations determined by said GPS and data representing said respective unique barcodes associated to said respective specific locations are stored in said computer system, said associated barcode scanner arrangement comprising a second mode wherein when reading said respective unique barcodes, said respective unique barcodes are associated to at least one test result representing an inorganic determination obtained by said reader from said respective microfluidic devices, and data representing said respective unique barcodes associated to said respective test results is stored in said computer system, wherein said computer system is configured for correlating said data representing said respective unique barcodes associated to said respective specific locations with said data representing said respective unique barcodes associated to said respective test results and to generate data representing said respective test result to said respective specific locations.

18. The system of claim 17, wherein said plurality of microfluidic devices comprises a barcode identical to or correlated to said respective unique barcode of said respective sample bags.

19. The system of claim 17, wherein said plurality of soil sample bags, each comprises an additional removable barcode correlated to or identical to said unique barcode, said respective microfluidic devices comprises a location for mounting said respective additional removable barcodes.

20. The system of claim 17, wherein said computer system is configured for generating date representing a set of latitude and longitude coordinates correlated to said respective test results and for transmitting said set of data to be displaced on a screen in list form and/or on a map.

* * * * *